(12) United States Patent
Bizub et al.

(10) Patent No.: US 11,313,750 B2
(45) Date of Patent: Apr. 26, 2022

(54) SYSTEM AND METHOD FOR DETECTING OPERATING EVENTS OF AN ENGINE VIA MIDI

(71) Applicant: AI ALPINE US BIDCO INC, Wilmington, DE (US)

(72) Inventors: Jeffrey Jacob Bizub, Waukesha, WI (US); Rajesh Katta, Bangalore (IN)

(73) Assignee: AI ALPINE US BIDCO INC, Wilmington, DE (US)

( * ) Notice: Subject to any disclaimer, the term of this patent is extended or adjusted under 35 U.S.C. 154(b) by 696 days.

(21) Appl. No.: 15/672,286

(22) Filed: Aug. 8, 2017

(65) Prior Publication Data

US 2019/0049329 A1 Feb. 14, 2019

(51) Int. Cl.
*G01L 23/22* (2006.01)
*G01M 15/12* (2006.01)
*F02B 77/08* (2006.01)
*F02D 41/28* (2006.01)
*F02D 35/02* (2006.01)

(52) U.S. Cl.
CPC .......... *G01L 23/225* (2013.01); *F02B 77/085* (2013.01); *F02D 35/027* (2013.01); *F02D 41/28* (2013.01); *G01M 15/12* (2013.01); *F02D 2041/288* (2013.01); *F02D 2200/025* (2013.01); *G10H 2210/086* (2013.01)

(58) Field of Classification Search
None
See application file for complete search history.

(56) References Cited

U.S. PATENT DOCUMENTS

| | | | | |
|---|---|---|---|---|
| 5,210,366 A | * | 5/1993 | Sykes, Jr. | G10H 1/0033 84/616 |
| 5,367,117 A | * | 11/1994 | Kikuchi | G10H 1/0066 84/603 |
| 5,942,709 A | * | 8/1999 | Szalay | G10H 1/12 84/616 |
| 9,159,325 B2 | | 10/2015 | Green | |
| 9,165,546 B2 | | 10/2015 | Setoguchi | |
| 9,177,540 B2 | | 11/2015 | Serletic, II et al. | |
| 2016/0223422 A1 | * | 8/2016 | Bizub | F02D 35/027 |

\* cited by examiner

*Primary Examiner* — Brent A. Fairbanks
(74) *Attorney, Agent, or Firm* — Fletcher Yoder, P.C.

(57) ABSTRACT

A method of monitoring an operating event of a combustion engine includes receiving a noise signal sensed by a knock sensor disposed in or proximate to the combustion engine, correlating the noise signal with a musical instrument digital interface (MIDI) fingerprint having at least an ADSR envelope indicative of the operating event, and detecting if the operating event has occurred based on the correlating of the noise signal with the fingerprint.

19 Claims, 11 Drawing Sheets

SYSTEM AND METHOD FOR DETECTING OPERATING EVENTS OF AN ENGINE VIA MIDI

The subject matter disclosed herein relates to fuel combusting engines and, more specifically, to a system and method for detecting operating events and conditions of a reciprocating engine using a knock sensor, for example, via musical instrument digital interface (MIDI).

Combustion engines typically combust a carbonaceous fuel, such as natural gas, gasoline, diesel, and the like, and use the corresponding expansion of high temperature and pressure gases to apply a force to certain components of the engine, e.g., piston disposed in a cylinder, to move the components over a distance. Each cylinder may include one or more valves that open and close correlative with combustion of the carbonaceous fuel. For example, an intake valve may direct an oxidizer such as air into the cylinder, which is then mixed with fuel and combusted. Combustion fluids, e.g., hot gases, may then be directed to exit the cylinder via an exhaust valve. Accordingly, the carbonaceous fuel is transformed into mechanical motion, useful in driving a load (e.g., a generator that produces electric power). In traditional configurations, timing of opening and closing the intake and exhaust valves during operation of the combustion engine may be monitored and estimated using traditional techniques. Traditional techniques may also be used for detecting certain other operating events and conditions (e.g., peak firing pressure) of the combustion engine. However, traditional monitoring techniques may not be accurate, and corrective measures utilizing the traditional monitoring techniques may reduce an efficiency of the internal combustion engine. Accordingly, improved monitoring of operating events and conditions, such as peak firing pressure and/or intake and exhaust valve closure (or opening) operating events, may be useful.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the present disclosure. Indeed, the present disclosure may encompass a variety of forms that may be similar to or different from the embodiments set forth below.

In a first embodiment, a method of monitoring an operating event of a combustion engine includes receiving a noise signal sensed by a knock sensor disposed in or proximate to the combustion engine, correlating the noise signal with a musical instrument digital interface (MIDI) fingerprint having at least an ADSR envelope indicative of the operating event, and detecting if the operating event has occurred based on the correlating of the noise signal with the fingerprint.

In a second embodiment, a system includes an engine controller configured to monitor a first operating event of a combustion engine. The controller includes a processor configured receive a noise signal sensed by a knock sensor disposed in or proximate to the combustion engine, correlate the noise signal with a first musical instrument digital interface (MIDI) fingerprint having at least a first ADSR envelope indicative of the first operating event, and detect if the operating event has occurred based on the correlating of the noise signal with the first fingerprint.

In a third embodiment, a non-transitory computer readable medium includes executable instructions that, when executed, cause a processor to receive, from a knock sensor disposed in or proximate to an internal combustion engine, noise data indicative of noise emitted by the internal combustion engine. The executable instructions, when executed, also cause the processor to receive, from a crankshaft sensor disposed in or proximate to the combustion engine, crank angle data indicative of a crank angle of a crankshaft of the internal combustion engine. Further, the executable instructions, when executed, cause the processor to plot the noise data against the crank angle data, determine a portion of the noise data that corresponds to a musical instrument digital interface (MIDI) fingerprint having a reference ADSR envelope indicative of an operating event of the internal combustion engine, superimpose the reference ADSR envelope over the portion of the noise data, and determine a location in the noise data at which the operating event occurred.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
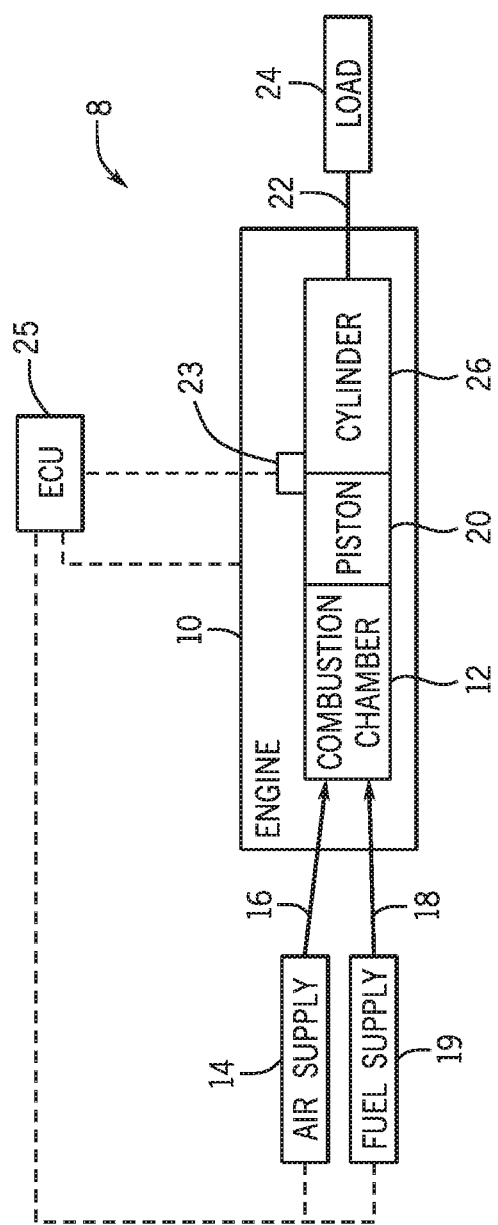
FIG. 1 is a block diagram of an embodiment of a portion of an engine driven power generation system in accordance with aspects of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments employ sensors (e.g., knock sensors, acoustic sensors, or vibration sensors) and baseline data (e.g., fingerprints of sound or vibration) to monitor, diagnose, and/or control an engine. In certain embodiments, a musical instrument digital interface (MIDI) format is used to store, transmit, and/or analyze the data described herein, including knock sensor data, baselines, fingerprints, and the like. When using a knock sensor to monitor a combustion engine, occasionally the knock sensor system records a noise, such as an abnormal or undesired noise that may not be identified at that time. Alternatively, the knock sensor may record a noise that is a normal or desired noise, where the noise has been previously identified and characterized. For example, noises emitted by the combustion engine during various actions by the combustion engine may be initially characterized during an in-factory baselining process. Noise signals for particular operating events and conditions (e.g., valve closures, valve openings, and peak firing pressure) during the baselining process may be processed and stored in a database as relating to one or more operating events. During normal operation of the combustion engine, data stored in the database relating to the operating events characterized during the baselining process may be accessed to determine if operational noise corresponds to the operating events characterized during the baselining process.

Advantageously, the techniques described herein may create a sound "fingerprint" of certain engine sounds or noise, via MIDI techniques. The fingerprint (e.g., profile, comparator, and/or reference signal) may be developed during the baselining process, as described above, and the fingerprint may correspond to a particular operating event (e.g., a valve closure) tested during the baselining process. It should be noted that the baselining process may be carried out during full operation of the combustion engine or while only operating certain components (e.g., the components relating to the operating event(s) being baselined) of the combustion engine. For example, in some embodiments, various operating events of the combustion engine may be baselined in-factory during part or full operation.

During full operation of the combustion engine (e.g., after baselining), noise may be detected by the knock sensor, and the noise signal may be processed, e.g., via MIDI techniques, and compared to various fingerprints (e.g., profiles, signatures, comparators, reference signals, unique indicia, unique representations, etc. stored in a MIDI file format) relating to the combustion engine. If the fingerprint and the processed noise signal correspond or correlate (e.g., "match"), the signal may be confirmed as corresponding to the operating event relating to the fingerprint. The noise signal may also be processed to determine time-sensitive information relating to the operating event that corresponds to the matched fingerprint and noise signal. For example, if the noise signal matches a fingerprint corresponding to closure of an exhaust valve, the noise signal may be plotted with respect to time (or crank angle) to determine when the exhaust valve closed.

As described in further detail below, systems and method are provided for identifying and classifying noise via an Attack-Decay-Sustain-Release (ADSR) envelope and/or joint time-frequency techniques, where the ADSR envelope may correspond to at least a portion of the above-referenced fingerprint. The joint time-frequency techniques may include cepstrum techniques, frequency techniques, chirplet techniques, and/or wavelet techniques to develop an acoustic model or fingerprint of the noise, as described in more detail below.

Turning to the drawings, FIG. 1 illustrates a block diagram of an embodiment of a portion of an engine driven power generation system 8. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). An air supply 14 is configured to provide a pressurized oxidant 16, such as air, oxygen, oxygen-enriched air, oxygen-reduced air, or any combination thereof, to each combustion chamber 12. The combustion chamber 12 is also configured to receive a fuel 18 (e.g., a liquid and/or gaseous fuel) from a fuel supply 19, and a fuel-air mixture ignites and combusts within each combustion chamber 12. The hot pressurized combustion gases cause a piston 20 adjacent to each combustion chamber 12 to move linearly within a cylinder 26 and convert pressure exerted by the gases into a rotating motion, which causes a shaft 22 to rotate. Further, the shaft 22 may be coupled to a load 24, which is powered via rotation of the shaft 22. For example, the load 24 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 18 may be any suitable gaseous fuel, such as natural gas, associated petroleum gas, propane, biogas, sewage gas, landfill gas, coal mine gas, for example.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders (e.g., 1-24). For example, in certain embodiments, the system 8 may include a large-scale industrial reciprocating engine having 4, 6, 8, 10, 16, 24 or more pistons 20 reciprocating in cylinders. In some such cases, the cylinders and/or the pistons 20 may have a diameter of between approximately 13.5-34 centimeters (cm). In some embodiments, the cylinders and/or the pistons 20 may have a diameter of between approximately 10-40 cm, 15-25 cm, or about 15 cm. The system 10 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The driven power generation system 8 may include one or more knock sensors 23 suitable for detecting engine "knock." The knock sensor 23 may be any sensor configured to sense sounds or vibrations caused by the engine 10, such as sound or vibration due to detonation, pre-ignition, and or pinging. The knock sensor 23 is shown communicatively coupled to an engine control unit (ECU) 25. During operations, signals from the knock sensor 23 are communicated to the ECU 25 to determine if knocking conditions (e.g., pinging) exist. The ECU 25 may then adjust certain engine 10 parameters to ameliorate or eliminate the knocking conditions. For example, the ECU 25 may adjust ignition timing and/or adjust boost pressure to eliminate the knocking. As further described herein, the knock sensor 23 may additionally derive that certain sounds or vibrations should be further analyzed and categorized to detect, for example, undesired engine conditions.

Figure 2:
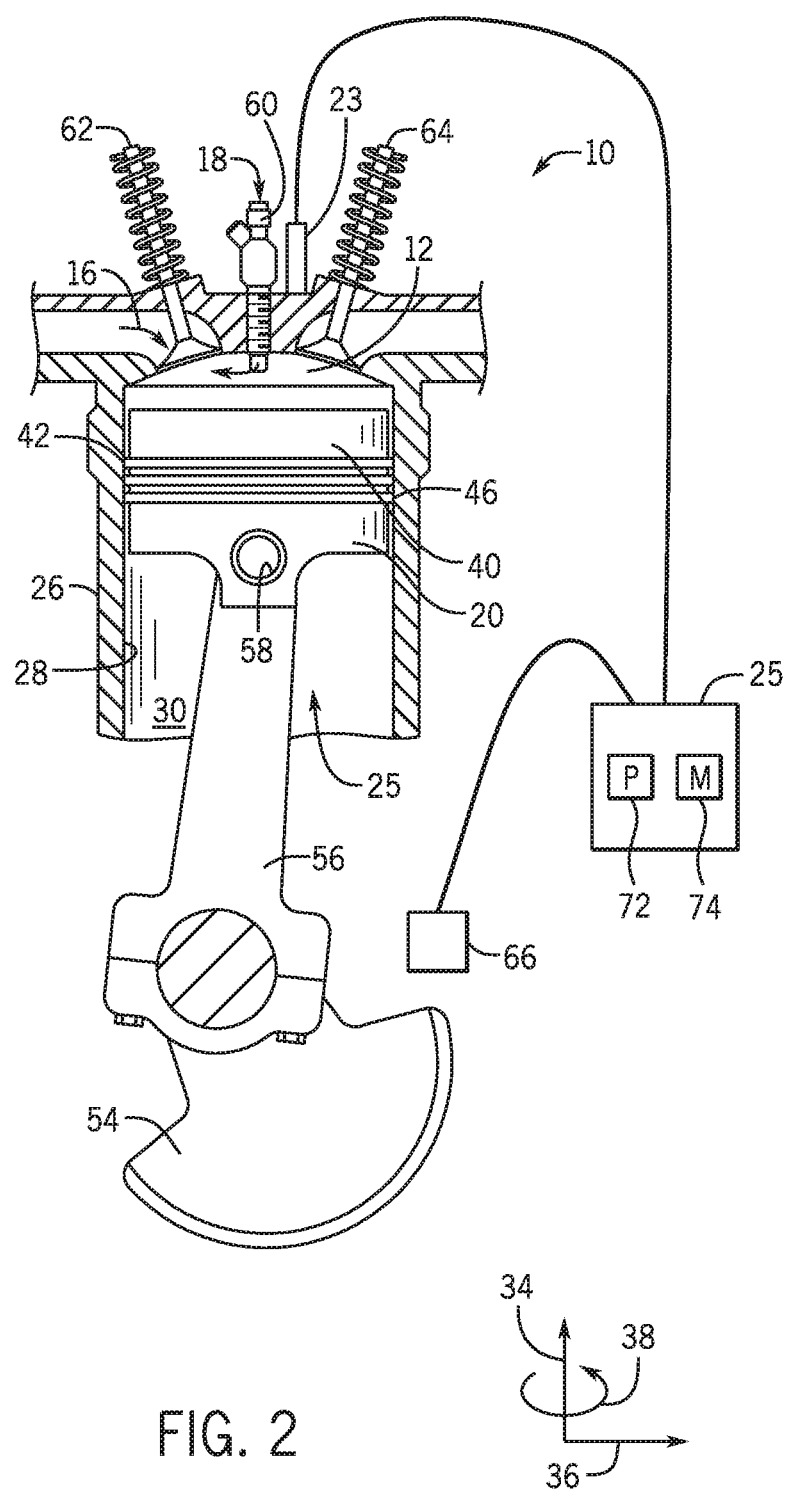
FIG. 2 is a side cross-sectional view of an embodiment of a piston assembly within a cylinder of the reciprocating engine shown in FIG. 1 in accordance with aspects of the present disclosure.

FIG. 2 is a side cross-sectional view of an embodiment of a piston assembly 25 having a piston 20 disposed within a cylinder 26 (e.g., an engine cylinder) of the reciprocating engine 10. The cylinder 26 has an inner annular wall 28 defining a cylindrical cavity 30 (e.g., bore). The piston 20 may be defined by an axial axis or direction 34, a radial axis or direction 36, and a circumferential axis or direction 38. The piston 20 includes a top portion 40 (e.g., a top land). The top portion 40 generally blocks the fuel 18 and the air 16, or a fuel-air mixture 32, from escaping from the combustion chamber 12 during reciprocating motion of the piston 20.

As shown, the piston 20 is attached to a crankshaft 54 via a connecting rod 56 and a pin 58. The crankshaft 54 translates the reciprocating linear motion of the piston 24 into a rotating motion. As the piston 20 moves, the crankshaft 54 rotates to power the load 24 (shown in FIG. 1), as discussed above. As shown, the combustion chamber 12 is positioned adjacent to the top land 40 of the piston 24. A fuel injector 60 provides the fuel 18 to the combustion chamber 12, and an intake valve 62 controls the delivery of air 16 to the combustion chamber 12. An exhaust valve 64 controls discharge of exhaust from the engine 10. However, it should be understood that any suitable elements and/or techniques for providing fuel 18 and air 16 to the combustion chamber 12 and/or for discharging exhaust may be utilized, and in some embodiments, no fuel injection is used. In operation, combustion of the fuel 18 with the air 16 in the combustion chamber 12 cause the piston 20 to move in a reciprocating manner (e.g., back and forth) in the axial direction 34 within the cavity 30 of the cylinder 26.

During operations, when the piston 20 is at the highest point in the cylinder 26 it is in a position called top dead center (TDC). When the piston 20 is at its lowest point in the cylinder 26, it is in a position called bottom dead center (BDC). As the piston 20 moves from top to bottom or from bottom to top, the crankshaft 54 rotates one half of a revolution. Each movement of the piston 20 from top to bottom or from bottom to top is called a stroke, and engine 10 embodiments may include two-stroke engines, three-stroke engines, four-stroke engines, five-stroke engine, six-stroke engines, or more.

During engine 10 operations, a sequence including an intake process, a compression process, a power process, and an exhaust process occurs. The intake process enables a combustible mixture, such as fuel and air, to be pulled into the cylinder 26, thus the intake valve 62 is open and the exhaust valve 64 is closed. The compression process compresses the combustible mixture into a smaller space, so both the intake valve 62 and the exhaust valve 64 are closed. The power process ignites the compressed fuel-air mixture, which may include a spark ignition through a spark plug system, and/or a compression ignition through compression heat. The resulting pressure from combustion then forces the piston 20 to BDC. The exhaust process typically returns the piston 20 to TDC while keeping the exhaust valve 64 open. The exhaust process thus expels the spent fuel-air mixture through the exhaust valve 64. It is to be noted that more than one intake valve 62 and exhaust valve 64 may be used per cylinder 26.

The depicted engine 10 also includes a crankshaft sensor 66, the knock sensor 23, and the engine control unit (ECU) 25, which includes a processor 72 and memory 74. The crankshaft sensor 66 senses the position and/or rotational speed of the crankshaft 54. Accordingly, a crank angle or crank timing information may be derived. That is, when monitoring combustion engines, timing is frequently expressed in terms of crankshaft 54 angle. For example, a full cycle of a four stroke engine 10 may be measured as a 720° cycle. The knock sensor 23 may be a Piezo-electric accelerometer, a microelectromechanical system (MEMS) sensor, a Hall effect sensor, a magnetostrictive sensor, and/or any other sensor designed to sense vibration, acceleration, sound, and/or movement. In other embodiments, sensor 23 may not be a knock sensor in the traditional sense, but any sensor that may sense vibration, pressure, acceleration, deflection, or movement, and may not be used to detect engine "knock."

Because of the percussive nature of the engine 10, the knock sensor 23 may be capable of detecting signatures even when mounted on the exterior of the cylinder 26. However, the knock sensor 23 may be disposed at various locations in or about the cylinder 26. Additionally, in some embodiments, a single knock sensor 23 may be shared, for example, with one or more adjacent cylinders 26. In other embodiments, each cylinder 26 may include one or more knock sensors 23. The crankshaft sensor 66 and the knock sensor 23 are shown in electronic communication with the engine control unit (ECU) 25. The ECU 25 includes a processor 72 and a memory 74. The memory 74 may store computer instructions that may be executed by the processor 72. The ECU 25 monitors and controls and operation of the engine 10, for example, by adjusting combustion timing, valve 62, 64, timing, adjusting the delivery of fuel and oxidant (e.g., air), and so on.

Advantageously, the techniques described herein may use the ECU 25 to receive data from the crankshaft sensor 66 and the knock sensor 23, and then to create a "noise" signature, such as a MIDI-based signature, by plotting the knock sensor 23 data against the crankshaft 54 position. The ECU 25 may then go through the process of analyzing the data to derive normal (e.g., known and expected noises) and abnormal signatures (e.g., unknown or unexpected noises). The ECU 25 may then characterize the signatures, as described in more detail below. By providing for signature analysis, such as MIDI-based signature analysis, the techniques described herein may enable a more optimal and a more efficient operation and maintenance of the engine 10.

MIDI techniques enable a more compact storage and/or transmission for certain of the data described herein, such as fingerprint data, data received via the knock sensor(s) 23, and the like. For example, fingerprint data, knock sensor data, and the like, may be converted into MIDI data for storage, transmission, and/or processing. The MIDI data may specify a notation, a pitch and velocity for certain music notes. MIDI data may also include control signals for parameters such as volume, vibrato, audio panning, cues, and clock signals that may set and synchronize tempo. The MIDI data may include one or more channels of data, such as between 1 to 32 channels of data. Applying MIDI techniques carries certain advantages, which include file compactness (sound data can be coded in a few hundred lines or thousand lines, e.g., in kilobytes, as opposed to megabytes or gigabytes), ease of modification and manipulation. Indeed, unlike digital or analog recordings of sound or vibration, MIDI symbolically represents a note and not a recording of the note (or of sound) itself. Because the actual sound is not recorded by rather represented symbolically, MIDI may be a lossy encoding as opposed to lossless encoding. MIDI files describe herein may be in standard MIDI file formats type 0, type 1, and/or type 2. It is to be noted that while the embodiments described herein refer to MIDI techniques, other techniques for symbolically representing sounds or vibrations as opposed to actual recordings of the sounds or vibrations may be used, including MusicXML, MuseData, notation interchange file format (NIFF), XEMO, Csound, Final, SharpEye, FreeHand, and so on.

Figure 3:
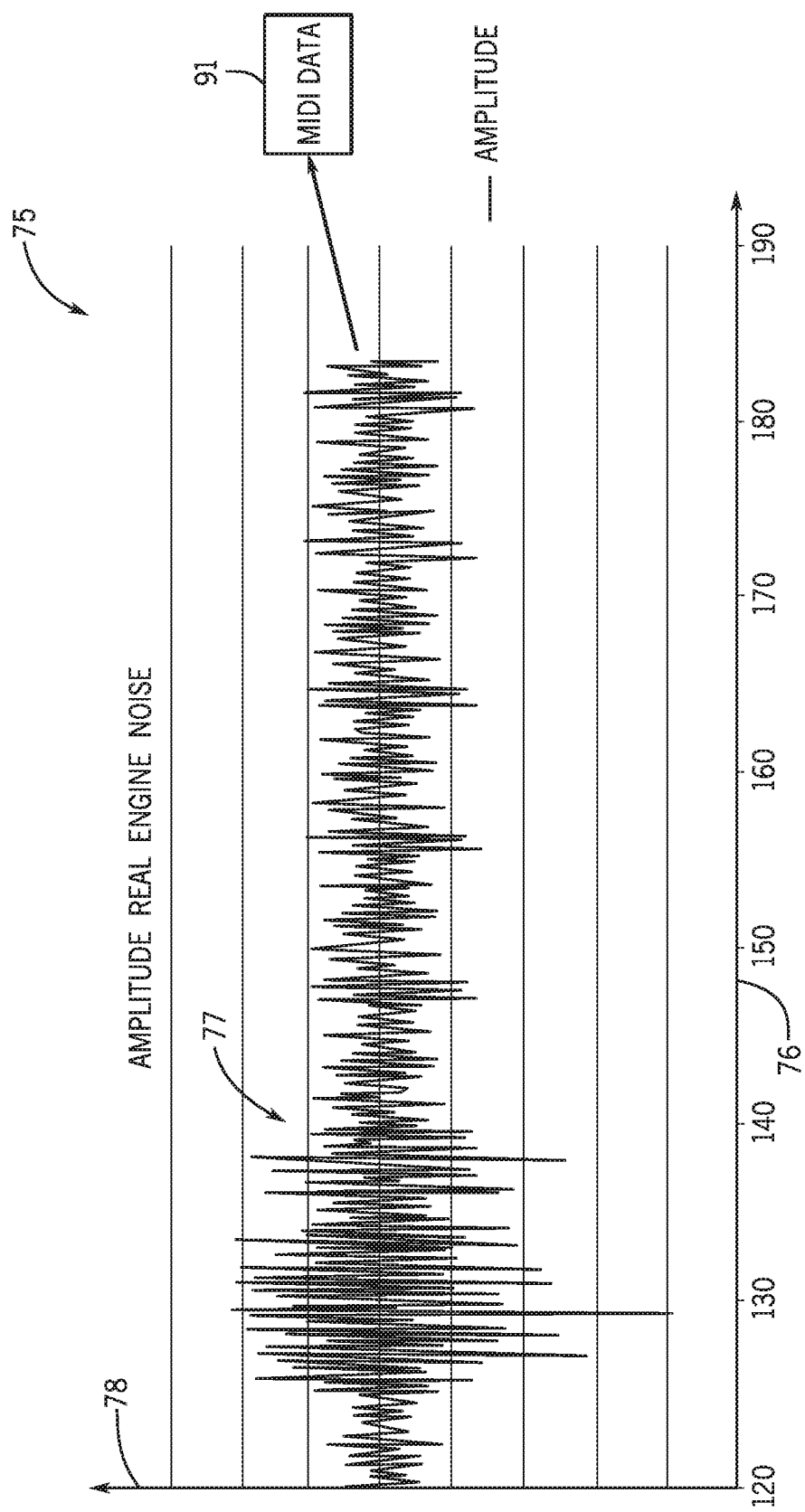
FIG. 3 is an embodiment of an engine noise plot of data measured by the knock sensor shown in FIG. 2 in accordance with aspects of the present disclosure.
Figure 5:
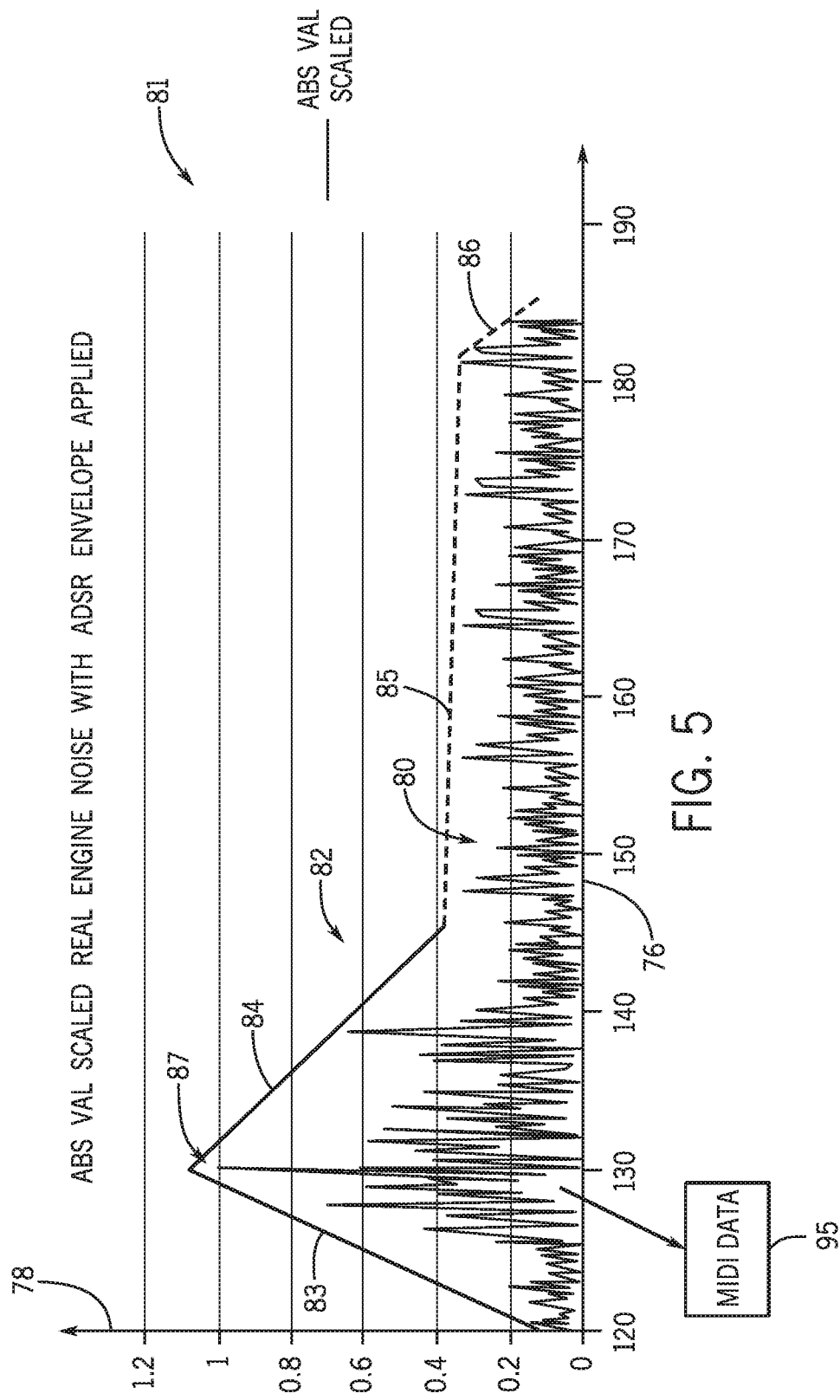
FIG. 5 is an embodiment of a sample scaled engine noise plot shown in FIG. 4 with four principle parameters of an attack, decay, sustain, release (ADSR) envelope overlaid in accordance with aspects of the present disclosure.
Figure 6:
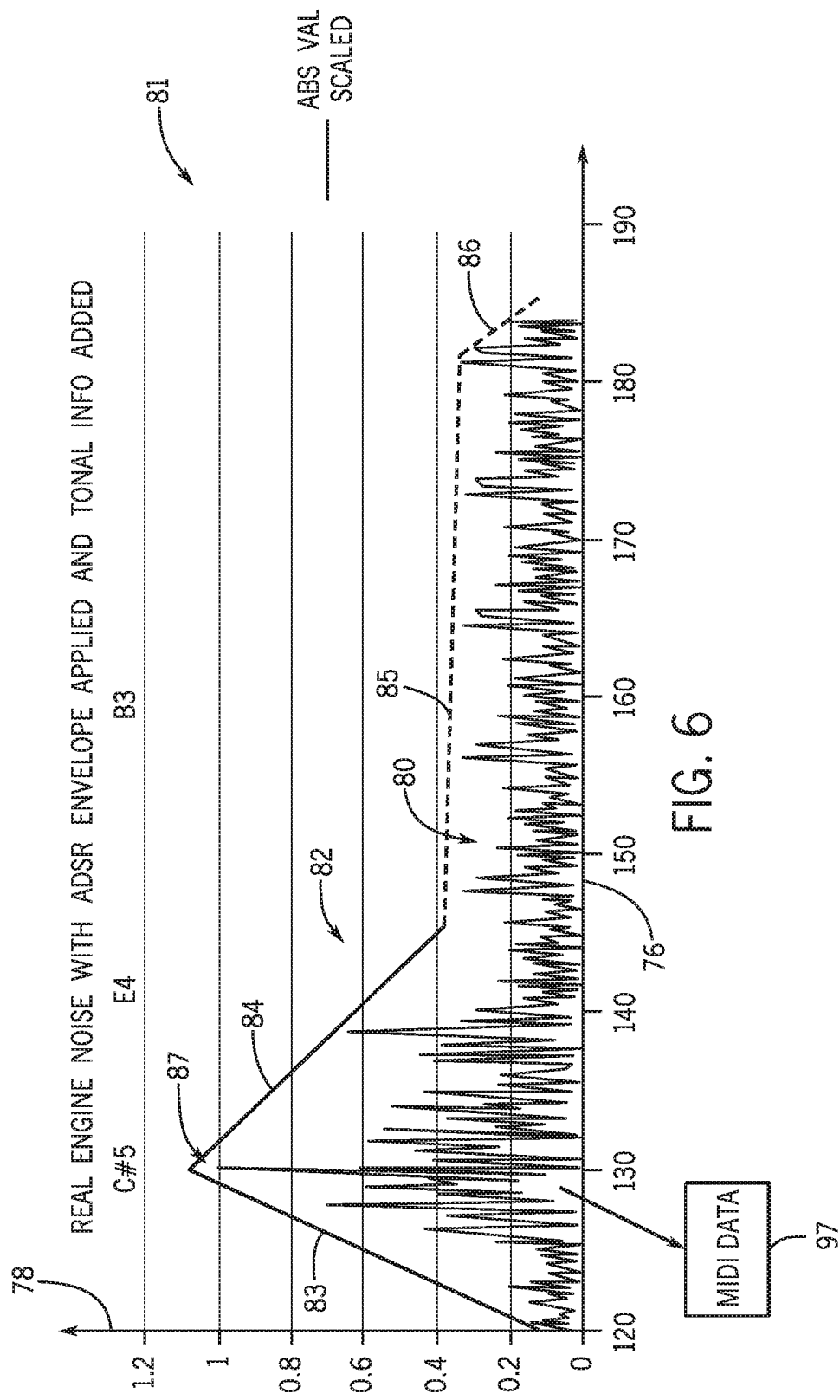
FIG. 6 is an embodiment of a scaled engine noise plot and ADSR envelope shown in FIG. 5 with the extracted tones overlaid in accordance with aspects of the present disclosure.
Figure 7:
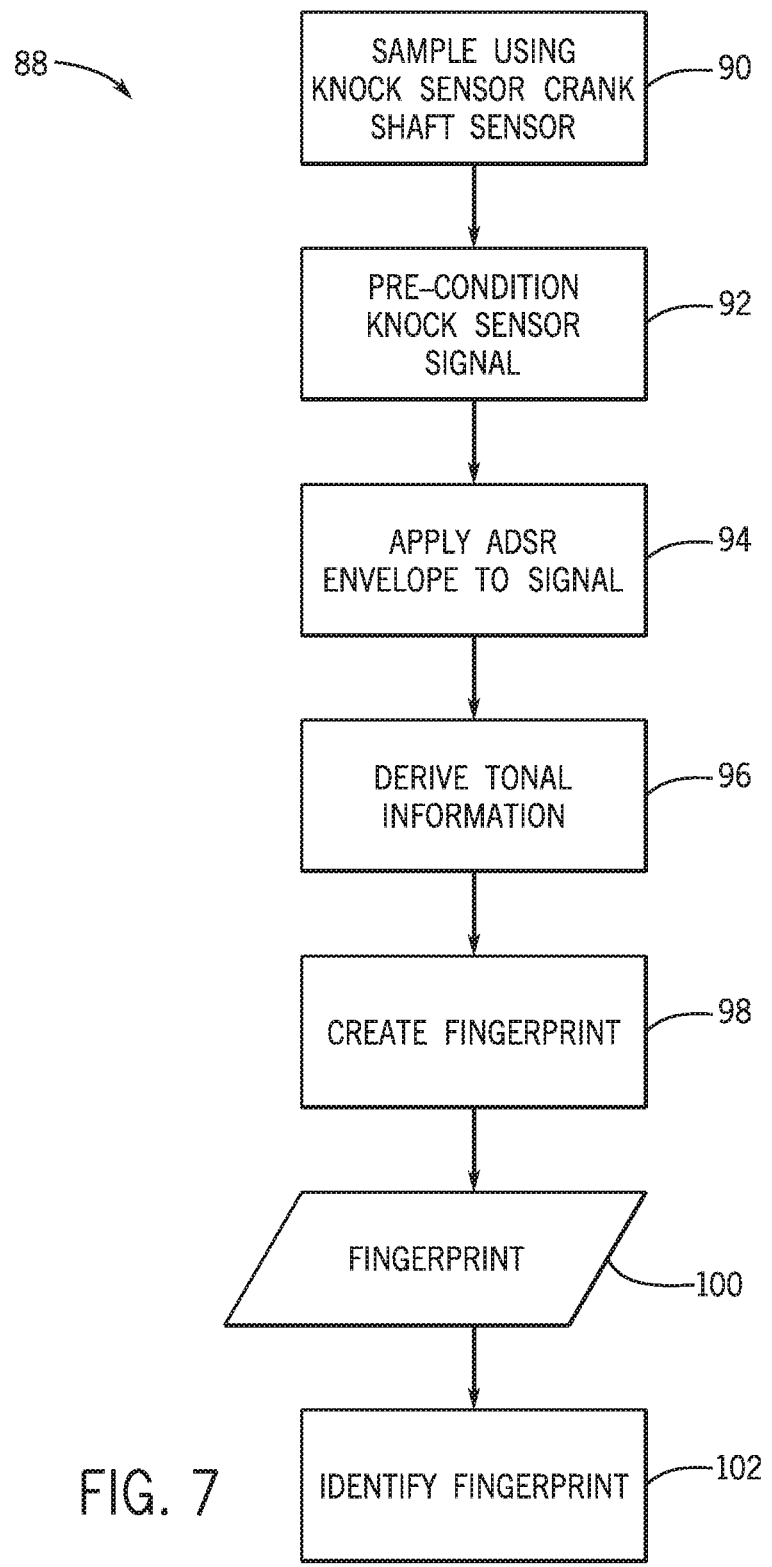
FIG. 7 is a flow chart showing an embodiment of a process for characterizing a noise in accordance with aspects of the present disclosure.
Figure 8:
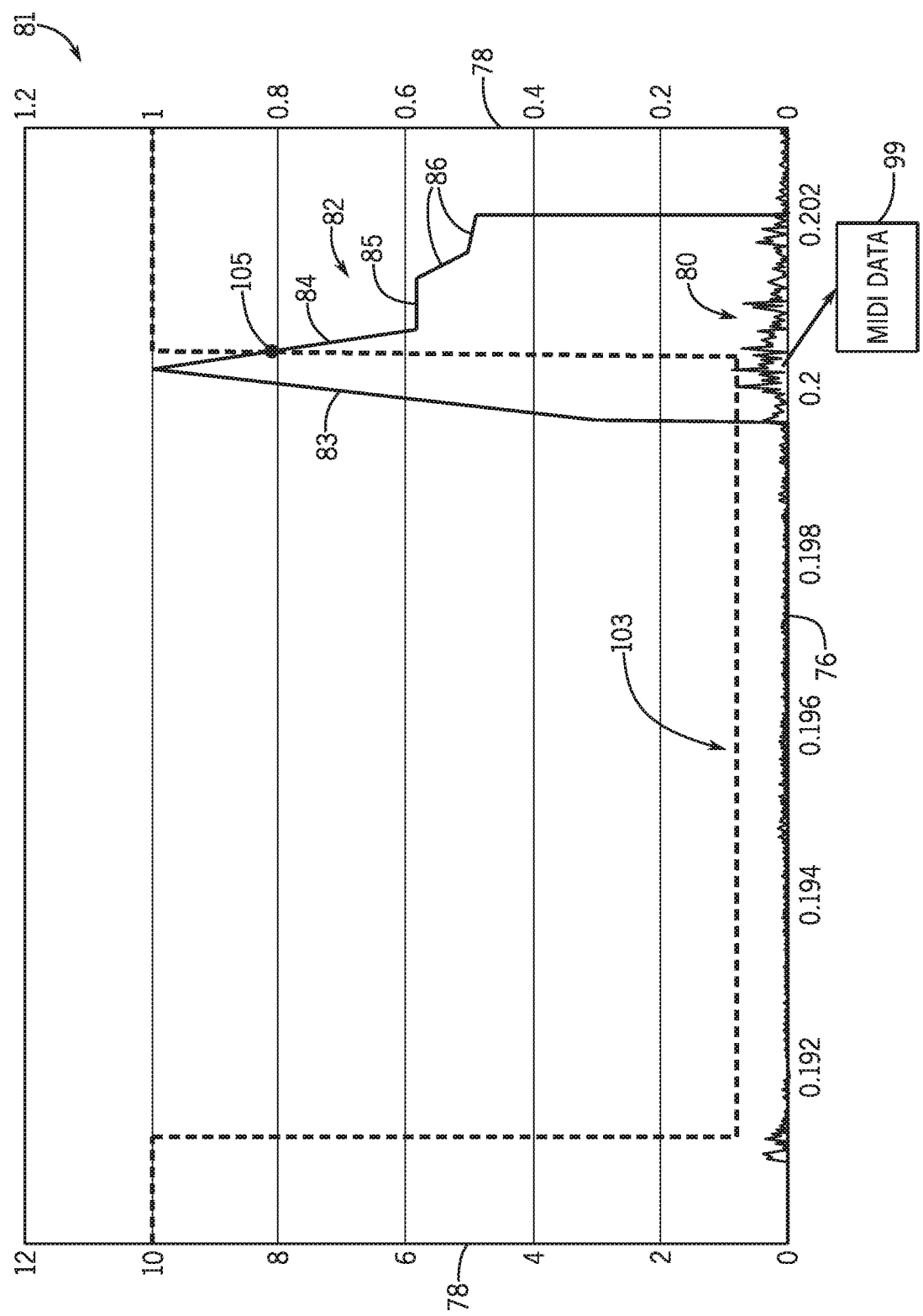
FIG. 8 is a an embodiment of a scaled engine noise plot corresponding to an engine operating event, an operating event indicator corresponding to the engine operating event, and an ADSR envelope corresponding to the engine operating event in accordance with the process of FIG. 7 and other aspects of the present disclosure.
Figure 9:
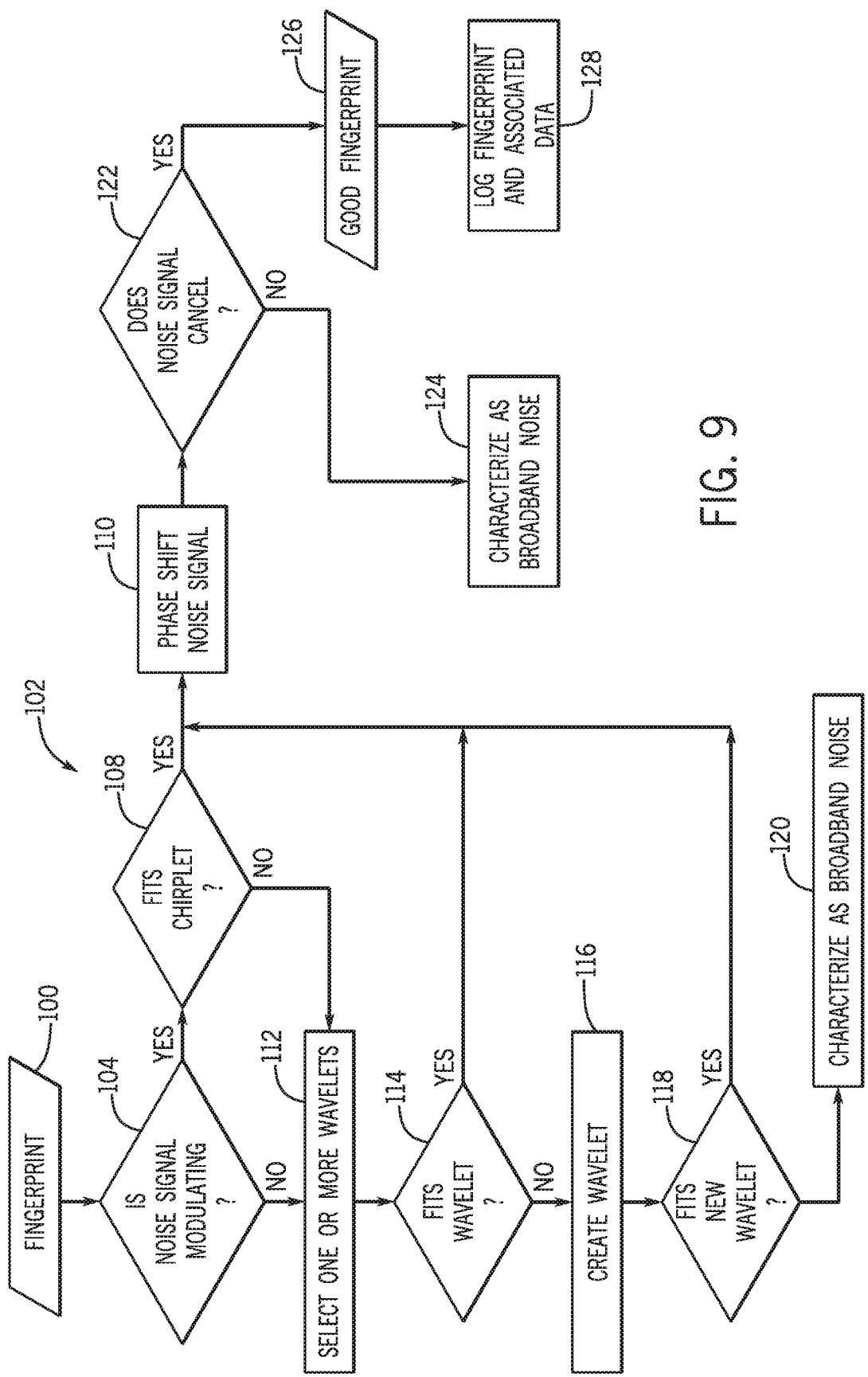
FIG. 9 is a flow chart showing an embodiment of a process for identifying a fingerprint shown in FIG. 7 in accordance with aspects of the present disclosure.

FIGS. 3-6 and 8 are illustrative of data that may be undergoing data processing, for example, via a process or processes described in more detail with respect to FIGS. 7 and 9. The data for FIGS. 3-6 and 8 may include data transmitted via the knock sensor 23 and the crankshaft sensor 66. For example, FIG. 3 is an embodiment of a raw engine noise plot 75 derived (e.g., by the ECU 25) of noise data measured by the knock sensor 23 in which x-axis 76 is crankshaft 54 position (e.g., crank angle), which is correlative of time. In accordance with present embodiments, the noise data may correspond to a particular operating event or action of the engine 10. For example, the noise data may correspond to opening or closing of a valve of the engine 10, for example, the exhaust valve 64. Alternatively, the noise data may correspond to peak firing pressure, which describes the highest pressure in the combustion chamber 12 during combustion.

The plot 75 is generated when the ECU 25 combines the data received from the knock sensor 23 and the crankshaft sensor 66 during operations of the engine 10. In the depicted embodiment, an amplitude curve 77 of the knock sensor 23 signal is shown, with an amplitude axis 78. That is, the amplitude curve 77 includes amplitude measurements of vibration data (e.g., noise, sound data) sensed via the knock sensor 23 plotted against crank angle. It should be understood that this is merely a plot of a sample data set (e.g., corresponding to closure of the exhaust valve 64), and not intended to limit plots generated by the ECU 25. The curve 77 may be encoded as MIDI data 91 and then stored in a MIDI file. For example, as the knock sensor(s) 23 transmit a signal, the signal may be processed (e.g., via the ECU 25) to derive corresponding MIDI "sounds" (e.g., notation, a pitch and velocity for certain music notes, and/or control signals for parameters such as volume, vibrato, audio panning, cues, and clock signals that may set and synchronize tempo) and encoded into the MIDI data 91. The curve 77, which may now be encoded as MIDI data 91, may then be scaled for further processing, as shown in FIG. 4.

Figure 4:
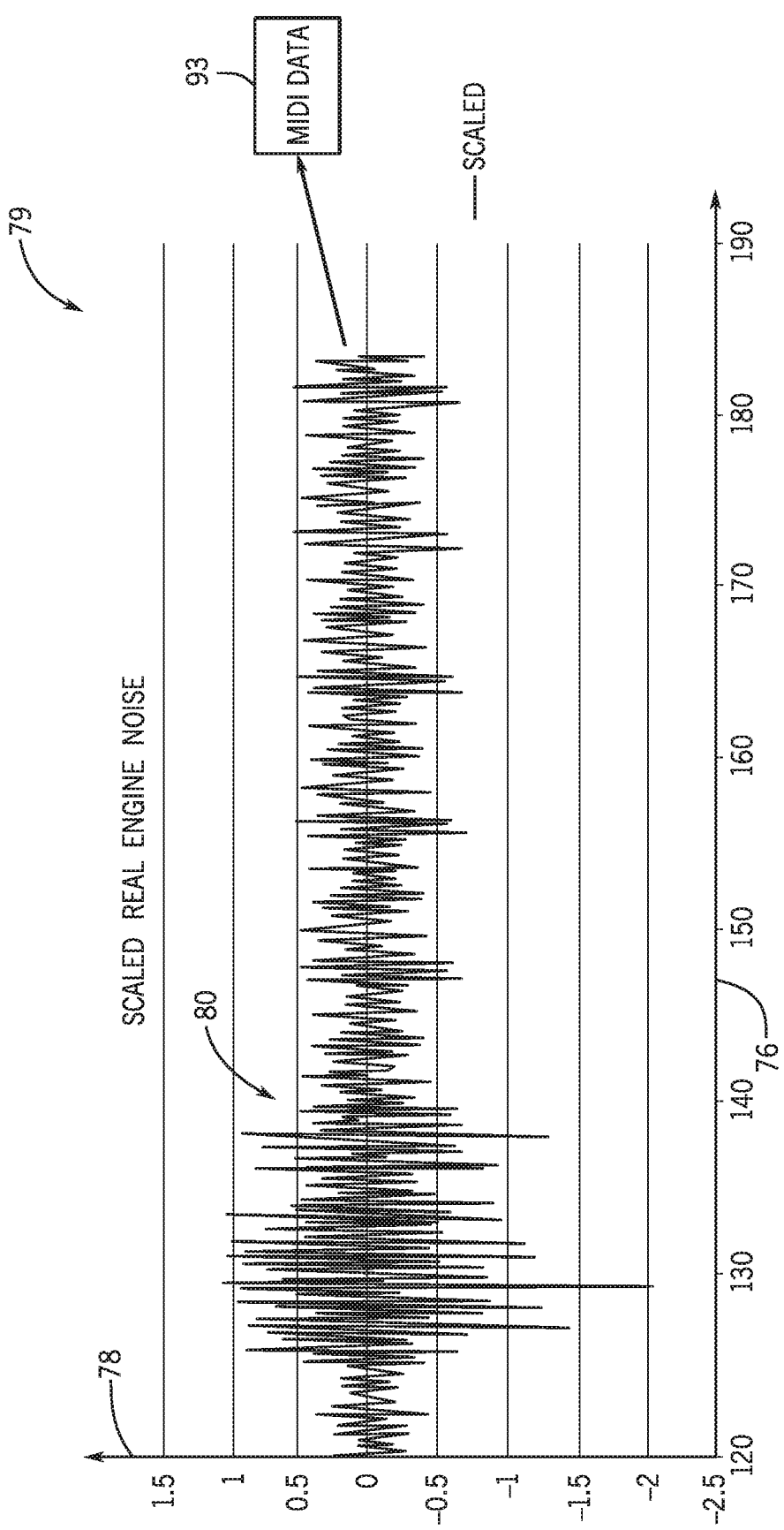
FIG. 4 is an embodiment of a scaled version of the sample engine noise plot shown in FIG. 3 in accordance with aspects of the present disclosure.

FIG. 4 is an embodiment of a scaled engine noise plot 79, which may be derived by the ECU 25. In the scaled plot 79, the raw engine noise from amplitude plot 75 shown in FIG. 3 has been scaled to derive a scaled amplitude curve 80. In certain embodiments, the MIDI data 91 encoded in one or more MIDI files may be scaled, such as via a multiplier or multipliers to the various sounds or notes. In other embodiments, the curve 77 may not be converted to MIDI but may instead be scaled first and then the scaled curve may be converted to MIDI.

In either case, a single multiplier has been applied to each data point (when not converted to MIDI data) or note (when converted to MIDI data) such that the maximum positive value of the scaled amplitude curve 80 is 1. Note that the multiplier applied to each point or note of curve 80 in order to produce a maximum positive value of 1 may result in negative values that are less than or greater than −1. That is, for example, the maximum negative value may be −0.5, or it may be −1.9, as shown in scaled engine noise plot 79 shown in FIG. 4. The figure also shows the curve 80 encoded as a MIDI data 93. As mentioned earlier, vibration or sound curves, such as the curve 80, may be processed (e.g., via the ECU 25) to derive corresponding MIDI "sounds" (e.g., notation, a pitch and velocity for certain music notes, and/or control signals for parameters such as volume, vibrato, audio panning, cues, and clock signals that may set and synchronize tempo) and encoded into MIDI files, such as via MIDI data 93.

FIG. 5 is an embodiment of a scaled engine noise plot 81 with four principle parameters of an attack, decay, sustain, release (ADSR) envelope 82 laid over the top of the plot. The ADSR envelope 82 is typically used in music synthesizers in order to mimic the sound of musical instruments. Advantageously, the techniques described herein apply the ADSR envelope 82 to knock sensor 23 data to more quickly and efficiently provide for certain noise analysis, as further described below. For example, the scaled curve 80 may be characteristic (or include characteristics) of a particular operating event (e.g., valve 62, 64 opening/closing or peak firing pressure in the combustion chamber 12) of the engine 10, and the ADSR envelope 82 developed for the scaled curve 80 may be utilized for future analysis of the operating event during operation of the engine 10. As for all plots or curves in all figures herein, plot 81 may be processed, stored, and/or transmitted as MIDI data, for example as MIDI data 95.

The four principle parameters of the ADSR envelope are attack 83, decay 84, sustain 85, and release 86. The attack 83 occurs from the start of the noise to a peak amplitude 87 of the scaled curve 80. The decay 84 occurs in the run down from the peak amplitude to a designated sustain 85 level, which may be some specified percent of the maximum amplitude. It should be understood that the order of the four parameters does not have to be attack, decay, sustain, and release. For example, for some noises, the order may be attack, sustain, decay, and release. In such cases, an ADSR, rather than ADSR, envelope would be applied. For the sake of simplicity, this will be referred to as an "ADSR envelope," but it should be understood that the term applies to a noise regardless of the order of the parameters. The sustain 85 level is the main level during the noise's duration. In some embodiments, the sustain 85 level may occur at 55% of the maximum amplitude. In other embodiments, the sustain 85 level may be at least equal to or greater than 35%, 40%, 45%, 50%, 60%, or 65% of the maximum amplitude. A user, or the ECU 25, may check whether the sustain level is as desired by determining whether the sustain 85 level is held for at least 15% of the duration of the signature. If the sustain 85 lasts more than 15% of the duration of the signature, the sustain 85 level is set as desired. The release 86 occurs during the run down from the sustain 85 level back to zero. It should be noted that, in some embodiments, the noise signal (e.g., the scaled amplitude curve 80) may be filtered via a high-pass filter, a low-pass filter, or a band-pass filter to attenuate portions of the signal having frequencies uncharacteristic of the operating event. The particular filter applied to the noise signal may depend on the operating event being monitored. For example, when monitoring valve 62, 64 events (e.g., openings and closures), a high-pass filter (e.g., greater than 10 kilohertz (kHz)) or a band-pass filter (e.g., between 10 and 20 kilohertz (kHz)) may be applied to the noise signal. When monitoring combustion events (e.g., peak firing pressure), a low-pass filter (e.g., less than 2 kilohertz (kHz)) may be applied to the noise signal.

FIG. 6 shows the same scaled engine noise plot 79 shown in FIGS. 4 and 5 with certain tones overlaid (e.g., superimposed). After applying the ADSR envelope 82, the ECU 25 may extract three to five of the strongest frequencies in the noise and convert them into musical tones. For example, a lookup table mapping frequency ranges to musical tones may be used. Additionally or alternatively, equations may be used based on the observation that pitch is typically perceived as the logarithm of frequency for equal temperament systems of tuning, or equations for other musical temperament systems. In other embodiments, more or less frequencies may be extracted. In the plot 81 shown in FIG. 6 the three prominent (e.g., extracted) tones are C#5, E4, and B3. It should be understood, however, that these three tones are merely examples of possible tones and not intended to limit what tones may be present in a recorded noise. It is also to be noted that the extracted notes and or the sounds for plot 81 may be encoded as MIDI data 97 and stored in MIDI file(s).

FIG. 7 is a flow chart showing an embodiment of a process 88 for characterizing a noise, such as a noise sensed via the knock sensor 23. By characterizing the noise, the noise can be logged and sorted for analysis, including future analysis and/or real-time analysis. For example, in some embodiments, the process 88 may be used for characterizing a noise relating to a particular operating event or action of the engine 10, such as peak firing pressure or opening/closing of intake or exhaust valves 62, 64. Further, the noise may first be characterized during a baselining process (e.g., an in-factory baselining process including the use of MIDI encoding) before the engine 10 is implemented for normal or full time operation, e.g., before being sold, deployed to a site, implemented at a site, etc. For example, before normal operation of the engine 10, various operating events (e.g., peak firing pressure, intake/exhaust opening/closing) may be tested by analyzing the noise emitted during the operating event(s) (and detected by the knock sensor 23), where the noise signals or ADSR envelopes 82 of the noise signals may be fingerprinted as relating to the operating events being tested, thus creating a baseline. It should be noted that the process 88 (e.g., baselining process) may be utilized when the engine 10 is not fully operating to simplify processing of the noise signal. For example, the process 88 may be utilized while only opening or closing a valve (e.g., the exhaust valve 64 or the intake valve 62) to characterize the noise corresponding to the opening or closing of the valve (e.g., the exhaust valve 64 or the intake valve 82). In other embodiments, the process 88 may be utilized during partial or during full engine 10 operations.

In the illustrated embodiment, the process 88 may be implemented as computer instructions or executable code stored in the memory 74 and executable by the processor 72 of the ECU 25. In block 90, a sample of data is taken using the knock sensor 23 and the crankshaft sensor 66. For example, the sensors 66, 23 collect data of an operating event (e.g., closure of the exhaust valve 74) during baselining and then transmit the data to the ECU 25. As previously described, the process 88 may be a baselining process and may be carried out while only particular components of the engine 10 are operating. For example, the process 88 may be carried out while opening and/or closing the exhaust valve 64 (or intake valve 62), such that the noise emitted during, for example, closing of the exhaust valve 64 may be readily processed. The ECU 25 then logs the crankshaft 54 angles at the start of data collection and at the end of data collection, as well as the time and/or crankshaft angle at the maximum (e.g., amplitude 87) and minimum amplitudes. Indeed, the crankshaft 54 angle may be logged continuously during the baselining process, enabling continuous plotting of the noise data against crankshaft 54 angle.

In block 92, the ECU 25 preconditions the knock sensor 23 data. This block 92 includes plotting the raw knock sensor 23 data against crankshaft 54 position or angle (or, in some embodiments, against time). A sample raw engine noise plot was shown in FIG. 3 as the amplitude plot 75, which may also be provided as MIDI data 91. This block 92 also includes scaling the raw engine noise data. To scale the data, the ECU 25 determines a multiplier that would result in a maximum amplitude of positive 1. It should be noted that the maximum negative value has no effect on multiplier selection. The ECU 25 then multiplies each data point (e.g., data point or music note in amplitude curve 77) by the multiplier, to derive the scaled amplitude curve 80, as shown in FIG. 4, which may also include MIDI data 93. It should be understood that the scaled engine noise plot 79 in FIG. 4 showing the scaled amplitude curve 80 is merely an example and not intended to limit the scope of this disclosure to plots that look the same or similar to scaled engine noise plot 79.

In block 94, the ECU 25 applies the ADSR envelope 82 to the engine noise signal. The processing in this block was discussed in describing FIG. 5, which may also include MIDI data 95 processing. The ADSR envelope 82 is used to divide a noise data set into four different parameters or phases (attack 83, decay 84, sustain 85, release 86). As previously discussed, it should be understood that the order of the four parameters does not have to be attack, decay, sustain, and release. For example, for some noises, the order may be attack, sustain, decay, and release, or any other possible order. For the sake of simplicity, this will be referred to as an "ADSR envelope," but it should be understood that the term applies to a noise regardless of the order of the parameters. Traditionally, the ADSR envelope 82 is used in the process of reproducing a musical sound like that of a trumpet. However, in the techniques described herein, the ADSR envelope may be used to categorize and characterize noises so they can be cataloged and sorted, either for later analysis, real-time analysis, or some other purpose. The four principle parameters of the ADSR envelope 82 are attack 83, decay 84, sustain 85, and release 86. The attack 83 occurs from the start of the noise to the peak amplitude 87. The decay 84 occurs in the run down from the peak amplitude 87 to a designated sustain 85 level, which is some specified percent of the maximum amplitude. The sustain 85 level is the main level during the noise's duration. In some embodiments, the sustain 85 level may occur at 55% of the maximum amplitude. In other embodiments, the sustain 85 level may be at least equal to or greater than 35%, 40%, 45%, 50%, 60%, or 65% of the maximum amplitude. A user, or the ECU 25, may check whether the sustain level is as desired by determining whether the sustain 85 level is held for at least 15% of the duration of the signature. If the sustain 85 lasts more than 15% of the duration of the signature, the sustain 85 level is set as desired. The release 86 occurs during the run down from the sustain 85 level back to zero. In block 94 the ECU 25 measures the time from zero to maximum amplitude 87 (the maximum amplitude should have a value of 1). The ECU 25 then measures the run down time from the maximum amplitude 87 to the designated sustain level 85. The ECU 25 then measures the level and time that the noise sustains. Finally, the ECU 25 measures the time it takes for the noise to run down from the sustain level 85 to zero. The ECU 25 then logs the ADSR vectors or segments defining the ADSR envelope 82.

In block 96, the ECU 25 derives tonal information (e.g., musical tones) from the data. This block was discussed in the description of FIG. 6. During this block, the ECU 25, extracts tonal information from the data, identifying, for example, the three to five strongest tones in the data. In another embodiment, any number of tones may be identified, e.g., 1, 2, 3, 4, 5, 6, 7, 8, 9, 10, or more tones. FIG. 6 shows three tones derived from the signal, C#5, E4, and B3. The ECU 25 may derive five or more tones from the data. Though FIG. 6 shows tones C#5, E4, and B3, it should be understood that these tones are examples and the ECU 25 may derive any tones from the data, including MIDI data 97. The ECU 25 then logs the derived tonal information, which may include the frequency of the fundamental derived tones (i.e., the lowest frequency tones), the order of the fundamental derived tones, the frequency of the harmonic derived tones (i.e., tones with a frequency that is an integer multiple of the fundamental frequency), the order of the harmonic derived tones, and any other relevant tonal information.

In block 98, the ECU 25 creates a fingerprint, such as a MIDI fingerprint 100 based upon the ADSR envelope 82 and the tonal information derived in blocks 94 and 96. The MIDI fingerprint 100 includes a symbolic MIDI-based characterization of the noise, breaking the noise up into its component parts (e.g., ADSR envelope 82 components 83, 84, 85, 86, which may help identify valve opening/closing events and/or peak firing pressure) and quantifying those parts so the noise can be cataloged, categorized, and sorted. At this point in the process, the MIDI fingerprint 100 is based mostly upon the ADSR envelope in block 94 and the tonal information derived in block 96.

In block 102, the MIDI fingerprint 100 is identified and checked. Using a number of techniques, which will be described later, the MIDI fingerprint 100 may be modified or added to and then checked again. It should be noted that, as previously described, the MIDI fingerprint 100 may be logged with reference to a particular operating event or action of the engine 10. For example, the process 88 may correspond to a baselining process that characterizes noise signals relative to particular operating events that may occur during operation of the engine 10. In particular, the noise signal detected during the process 88 may relate to peak firing pressure, closure or opening of the exhaust valve 64, closure or opening of the intake valve 62, or a combination thereof. The fingerprint 100 may be stored in the memory 74 of the ECU 25 as corresponding to the particular operating event or condition being tested (e.g., baselined).

In some embodiments, the process 88 (e.g., baselining process) may include one or more additional steps that further processes the noise signal or ADSR envelope 82 to provide additional information relating to the operating event (e.g., opening or closing of the exhaust or intake valves 64, 62) or action of the engine 10. For example, for clarity, FIG. 8 is an embodiment of a scaled engine noise plot 81 with a scaled amplitude curve 80 corresponding to an engine operating event (e.g. valve opening or closing event), an operating event indicator 103 corresponding to the engine operating event, and an ADSR envelope 82 corresponding to the engine operating event in accordance with the process of FIG. 7. It should be noted, that the curve 80 may be stored, transmitted, and/or processed as MIDI data 99, and that as previously described, the engine operating event and the corresponding plot 81 in FIG. 8 may be tested (e.g., baselined via the process 88) while the engine 10 is not fully operating. Thus, the fluctuations in the illustrated amplitude curve 80 occur at predictable times corresponding to the operating event, and enable simpler processing. In other words, in some embodiments, no components or operating events of the engine 10 may emit noise other than the components or operating events being tested (e.g., baselined). Additionally or alternatively, the noise signal may be filtered via a high-pass filter, a low-pass filter, or a band-pass filter to attenuate portions of the signal having frequencies uncharacteristic of the operating event. The particular filter applied to the noise signal may depend on the operating event being monitored. For example, when monitoring valve 62, 64 events (e.g., openings and closures), a high-pass filter (e.g., greater than 10 kilohertz (kHz)) or a band-pass filter (e.g., between 10 and 20 kilohertz (kHz)) may be applied to the noise signal. When monitoring combustion events (e.g., peak firing pressure), a low-pass filter (e.g., less than 2 kilohertz (kHz)) may be applied to the noise signal.

With reference to the process 88 shown in FIG. 7, the MIDI fingerprint 100 having the ADSR envelope 82 information shown in FIG. 8 (e.g., with the attack 83, decay 84, sustain 85, and release 86) may include additional information relating to the operating event being fingerprinted or baselined. For example, during the process 88 (e.g., baselining process), an operating event indicator 103 may also be plotted over the scaled/normalized engine noise plot 81. The operating event indicator 103, for example, may be a plot provided by a switch (e.g., limit switch) that modulates between high and low to indicate the operating event during the baselining process (e.g., process 88). For example, the switch may be actuated each time the operating event occurs during the baselining process. However, in general, the switch may not be included in the engine 10 during normal operation of the engine 10, as inclusion of both the switch and the knock sensor 23 may be redundant and expensive. Thus, the switch and the corresponding operating event indicator 103 may be used during the baselining process (e.g., process 88) to more accurately determine a location in the ADSR envelope 82 at which the operating event specifically occurs (e.g., within 2-4 degrees crankshaft 54 angle, depending on the operating event), such that the ADSR envelope 82 can be stored to the ECU 25 and later utilized during normal operation of the engine 10 to determine a crankshaft 54 angle or timing at which the operating event more specifically occurs within the ADSR envelope 82.

In the illustrated embodiment, the operating event is a closure of the exhaust valve 64 shown in FIG. 2. As the exhaust valve 64 closes, the switch is actuated, thereby causing the limit switch to move from low (e.g., low voltage) to high (e.g., high voltage). The switch transmits a signal of the operating event indicator 103 to the ECU 25, which may plot the operating event indicator 103 on the scaled engine noise plot 81. An intersecting point 105 between the operating event indicator 103 and the ADSR envelope 82 may be stored along with the fingerprint 100 corresponding to the operating event (e.g., the closure of the exhaust valve 64). In the illustrated embodiment, the intersecting point 105 is located at an approximate midpoint of the decay 84 vector (e.g., within 5-10 percent of a length of the decay 84 vector from the midpoint). In general, closing of the exhaust valve 64 occurs at the midpoint or mid-region of the decay 84 vector (e.g., where the mid-region is an area defined by 5-10 percent of a length of the decay 84 vector on either side of the midpoint of the decay 84 vector), and coordinates of the midpoint of the decay 84 vector can be calculated using a geometric midpoint relationship, e.g., $P_i=[(X_1+X_2)/2, (Y_1+Y_2)/2]$, where $P_i$ is the midpoint (and, thus, the intersecting point 105), $X_1$ and $X_2$ are the X coordinates along axis 76 at either end of the decay 84 vector, and $Y_1$ and $Y_2$ are the Y coordinates along axis 78 at either end of the decay 84 vector. It should be noted that axis 78 in the illustrated embodiment includes time, but, in another embodiment, the axis 78 may include crankshaft 54 angle (e.g., crank angle) information from the crankshaft sensor 66, which is correlative of time.

After determining the intersection point 105 (which, in the illustrated embodiment relating to closure of the exhaust valve 64, is the midpoint of the decay 84 vector of the ADSR envelope 82), the MIDI fingerprint 100 (e.g., having the ADSR envelope 82 information and the intersection point 105 information) may be stored for later analysis.

In some embodiments, it may be beneficial to check the MIDI fingerprint 100 to ensure that the MIDI fingerprint 100 is accurate and can be used to identify operating events during normal operation of the combustion engine 10. For example, FIG. 9 is a flow chart showing further details of an embodiment of process 102, which identifies and checks the fingerprint 100 depicted in FIG. 7. The process 102 may be implemented as computer instructions or executable code stored in the memory 74 and executable by the processor 72 of the ECU 25. In decision 104, the ECU 25 determines whether or not the noise signal is modulating (i.e., changing from one tone to another). If the signal is not modulating (decision 104), then the ECU 25 moves on to block 112 and attempts to find a matching wavelet. A wavelet, effectively a piece or component of a wave, is a wave-like oscillation with an amplitude that begins at zero, increases, decreases, or both, and then returns to zero. Wavelets can be modified by adjusting the frequency, amplitude, and duration, which makes them very useful in signal processing. For example, in continuous wavelet transforms, a given signal may be reconstructed by integrating over the various modified frequency components. Example "mother" wavelets include Meyer, Morlet, and Mexican hat wavelets. However, new wavelets may also be created if the mother wavelets do not fit.

If the sound is modulating (decision 104), the ECU 25 moves on to decision 108 and determines whether or not the noise signal fits a chirplet. A chirp is a signal in which the frequency increases or decreases with time. Just as a wavelet is a piece of a wave, a chirplet is a piece of a chirp. Much like wavelets, the characteristics of a chirplet can be modified, and then multiple chirplets combined (i.e., a chirplet transform), in order to approximate a signal. A chirplet may modulate (i.e., change frequency) upward or downward. In decision 108, the ECU 25 may adjust the modulation of chirplets in order to fit the chirplets to the noise signal. If the ECU 25, after adjusting the modulation of chirplets, can adjust chriplets to fit the noise signal, then the ECU 25 logs whether there was a chirplet that fit the signal, and if so, the first frequency of the chirplet, the second frequency of the chirplet, and the rate of chirplet modulation in frequency/ (crank angle) or frequency per second. The ECU 25 then moves to block 110, in which the ECU 25 phase shifts the noise signal in order to check the fingerprint 100. In block 110, the ECU 25 creates a generated noise signal based upon the ASDR envelope 82 vectors or other components, extracted tonal information, and chirplet or wavelet fits. The ECU 25 then shifts (block 110) the generated signal, e.g., 180 degrees out of phase. If the characterization of the noise signal is correct, the phase-shifted generated noise signal should cancel out the noise signal.

If the noise signal does not fit a chirplet (decision 108), the ECU 25 moves on to block 112 and attempts to fit a wavelet to the noise signal. In block 112, the ECU 25 selects one or more wavelets that may fit the noise signal. The selected wavelet or wavelets may be a Meyer wavelet, a Morlet wavelet, a Mexican hat wavelet, or some other suitable wavelet. In decision 114, the ECU 25 determines whether or not the selected wavelet or wavelets fits the noise signal. If the selected wavelet fits (decision 114), the ECU 25 logs that there was a wavelet fit, the mother wavelet type, the first scale range of the wavelet, and the second scale range of the wavelet. If the wavelet fits (decision 114), the ECU 25 moves on to block 110, in which the ECU 25 phase shifts the noise signal in order to check the fingerprint 100. If one of the selected wavelets does not fit the noise signal (decision 114), the ECU 25 may move on to block 116 and create a wavelet. In decision 118, the ECU 25 determines if the newly created wavelet fits the noise signal. If the created wavelet fits (decision 118), the ECU 25 logs that there was a wavelet fit, the first scale range of the wavelet, and the second scale range of the wavelet. If the created wavelet fits the noise signal (decision 118), the ECU 25 moves on to block 110, in which the ECU phase shifts the noise signal in order to check the fingerprint 100. If the new wavelet does not fit (decision 118), the ECU 25 moves on to block 120 in which it characterizes the noise signal as broadband noise.

Returning now to block 110, if the ECU 25 finds a chirplet or wavelet that fits the noise signal, the ECU 25 may check the fit by attempting noise cancellation. Accordingly, in block 110, the ECU 25 creates a generated noise signal based upon the ASDR envelope 82 vectors or other components, extracted tonal information, and chirplet or wavelet fits. The ECU 25 then shifts (block 110) the generated signal by 180 degrees. The ECU 25 then determines (decision 122) whether the shifted signal cancels out the original noise signal within a desired residual tolerance. If the shifted signal cancels out (decision 122) the original noise signal within a desired residual tolerance, the ECU 25 determines that the fingerprint 100 is a "good" fingerprint 126 and moves on to block 128, in which the ECU 25 logs the coefficients and associated data, which may include the root mean squared (RMS) value of the signal, or the RMS error. The ECU 25 may log other data as well, including, but not limited to crankshaft angles at the beginning or end of the signal, ASDR envelope 82 vectors or other ADSR components, fundamental spectral tones, harmonic spectral tones, order of spectral tones, order of harmonic tones, whether a chirplet fit, the first chirplet frequency, the second chirplet frequency, the rate of chirplet modulation, whether a wavelet fit, the mother wavelet type, the first scale range of the wavelet, the second scale range of the wavelet, the maximum amplitude value and time, the minimum amplitude value and time, the RMS value of the signal, the RMS error of the signal against the generated signal, and whether or not the noise is classified as broadband noise. Further, as previously described, the ECU 25 may log the intersecting point 105 on the ADSR envelope 82, as shown in FIG. 8. This logged data, and other data logged by the ECU 25, allows the ECU 25 to characterize and categorize known noises (e.g., corresponding to certain operating events described in the present disclosure) so these noises can be stored on the memory component 74 of the ECU 25, perhaps transferred to some other memory device, and then logged and sorted in a database for future analysis. If, on the other hand, the ECU 25 determines (decision 122) that the shifted signal did not cancel out the original noise signal within a residual tolerance, the ECU 25 moves on to block 124 in which the noise signal is characterized as broadband noise.

Figure 10:
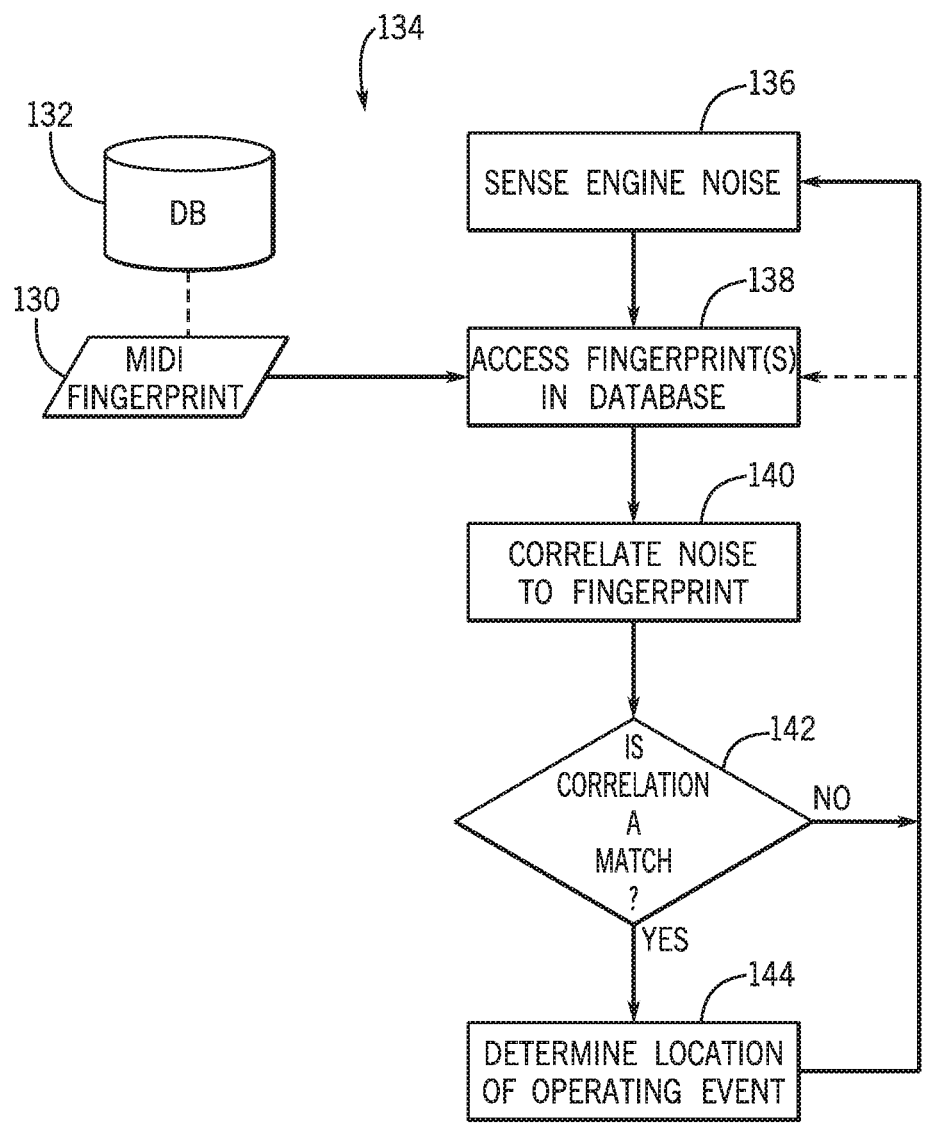
FIG. 10 is a flow chart of an embodiment of a process suitable for processing engine noise to derive certain engine operating events.

It should be noted that, depending on the embodiment, the process 102 in FIG. 9 may not be employed following the baselining method (e.g., process 88). For example, in some embodiments, it may be determined that the fingerprint 100 is a "good fingerprint 126" without employing process 102. In either case, verified MIDI fingerprints 130 (e.g., fingerprint 100 and/or good fingerprint 126) may be stored in a database 132 for later access during an engine monitoring process 134, as shown in an embodiment of the process 134 in FIG. 10. For example, during the illustrated process 134, noise from the engine 10 is sensed (e.g., detected or recorded) (block 136). As previously described, the noise may be sensed via the knock sensor 23, or some other sensor configured to detect noise or vibrations of the engine 10. The noise signal may be preconditioned (e.g., scaled, normalized, and/or filtered) for processing, in accordance with the description of FIGS. 3-5. The crankshaft sensor 66 may also sense, detect, or record a position of the crankshaft 54 (e.g., in crank angles). Accordingly, the noise signal (e.g., preconditioned noise signal) may be plotted, via the ECU 25, against the position of the crankshaft 54. As previously described, in certain embodiments, the noise signal may be plotted against time instead of position of the crankshaft 54.

The process 134 further includes accessing the MIDI fingerprints 130 in the database 132 (block 138). For example, the ECU 25 may access the fingerprint 130 that relates to a particular operating event being monitored via the process 134. Depending on the embodiment, the operating event (or condition) may be peak firing pressure, opening of the intake valve 62, closing of the intake valve 62, opening of the exhaust valve 64, closing of the exhaust valve 64, or some other operating event (or condition) of the engine 10.

After accessing the MIDI fingerprint 130 corresponding to the operating event (or condition) being monitored by the ECU 25 via process 134, the ECU 25 may correlate the MIDI fingerprint 130 and the noise signal (e.g., preconditioned noise signal) to determine if the noise signal includes a portion that matches the fingerprint 130. For example, as previously described, the MIDI fingerprint 130 may include the ADSR envelope 82 relating to the operating event being monitored and generated during the baselining process (e.g., process 88). The ADSR envelope 82 of the fingerprint 130 may be shifted or dragged along the time or crankshaft 54 position axis of the noise signal (e.g., preconditioned noise signal) to determine if the MIDI fingerprint 130 matches any portion of the noise signal. For example, the ADSR envelope 82 of the fingerprint 130 may be directly compared or matched with portions of the noise signal, or one or more operating ADSR envelopes may be generated for portions of the noise signal (e.g., in accordance with the descriptions of FIGS. 5 and 6) to compare with the ADSR envelope 82 of the MIDI fingerprint 130. Further, in general, the operating event may have occurred within a known range of time or crankshaft 54 positions (e.g., in crank angles). Thus, the portion of the noise signal processed by the ECU 25 to determine whether a portion of the noise signal matches the MIDI fingerprint 130 may be reduced to the known range of time or crankshaft 54 positions. It should be noted that the match between the MIDI fingerprint 130 and the noise signal may not be an exact match between the MIDI fingerprint 130 and the noise signal (e.g., MIDI encoded noise signal). For example, the MIDI fingerprint 130 may substantially match a portion of the noise signal and may be rated by a percentage of accuracy of the match. A threshold (e.g., stored in the memory 74 of the ECU 25) may enable the ECU 25 to determine if the percentage of accuracy of the match between the MIDI fingerprint 130 and the noise signal is substantial enough to consider the MIDI fingerprint 130 and the noise signal a match. The threshold may be at least equal to or greater than a 75% match, an 80% match, an 85% match, a 90% match, a 95% match, a 97% match, a 98% match, a 99% match, or a 100% match.

In decision 142, the ECU 25 determines if the MIDI fingerprint 130 matches any portion of the noise signal (e.g., preconditioned noise signal) from block 136. If the correlation in block 140 is a match in decision 142, the operating event being monitored is verified. Further, as shown in block 144, the particular location of the operating event (e.g., in time or in crank angles of the crankshaft 54) may be determined. For example, as previously described, the operating event may occur at the intersection point 105 (e.g., between the ADSR envelope 82 and the operating event indicator 103) in FIG. 8, which, in some embodiments, corresponds to the midpoint on the decay 84 vector of the ADSR envelope 82. Accordingly, the ECU 25 may overlay the ADSR envelope 82 of the fingerprint 130 on the noise signal plotted against crankshaft 54 position, and determine that the operating event occurred at the x-coordinate (e.g., time or crankshaft 54 position coordinate) of the intersection point 105 on the ADSR envelope 82.

If the MIDI fingerprint 130 is not matched with any portion of the noise signal at decision 142, the process 134 may either return to block 136 (e.g., sense engine noise) or return to block 138 (access fingerprint(s) in database). For example, in some embodiments, the process 134 may be utilized to monitor multiple operating events. Accordingly, the process 134 may include accessing multiple fingerprints 130 for correlation with the noise signal. The multiple fingerprints 130 may be accessed all in one step, or each fingerprint 130 may be accessed and then correlated to the noise signal independently to determine and verify operating events.

In accordance with the present disclosure, it should be noted that operating event(s) and conditions may be any operating event or condition of the engine 10. For example, the operating event may be an opening of the exhaust valve 64, a closing of the exhaust valve 64, an opening of the intake valve 62, a closing of the intake valve 62, peak firing pressure, valve disconnect, valve lash or valve clearance issues (e.g., too much distance between certain valve train components such as rocker arms and valve tappet), or any other operating event of the engine 10. Further, it should be noted that the crank angle at which the operating event occurs may be determined by the same or similar process steps described above. For example, in some embodiments, the operating event may occur at a different point along the decay 84 vector, or along one of the other vectors of the ADSR envelope 82. The operating event indicator 103 shown in FIG. 8 may be provided to the ECU 25 by a limit switch, or by some other mechanism configured to detect the operating event during the baselining process (e.g., process 88) that may not be included in the engine 10 during normal operation. Further, it should be noted that the fingerprints 100, 126, 130 associated with each operating event may vary for each operating event, and may vary for each model, make, or series of engines 10. Thus, the baselining process (e.g., process 88) to determine fingerprints 100, 126, 130 for various operating events may be carried out for each particular engine 10, and each engine 10 may include different MIDI fingerprints 100, 126, 130 for the same operating event. Such fingerprinting may then be used in the field to determine that the operating event has occurred. For example, noise from one or more knock sensors 23 may be compared against fingerprints in the database 132 and matches used to determine the various operating events and/or engine conditions.

Figure 11:
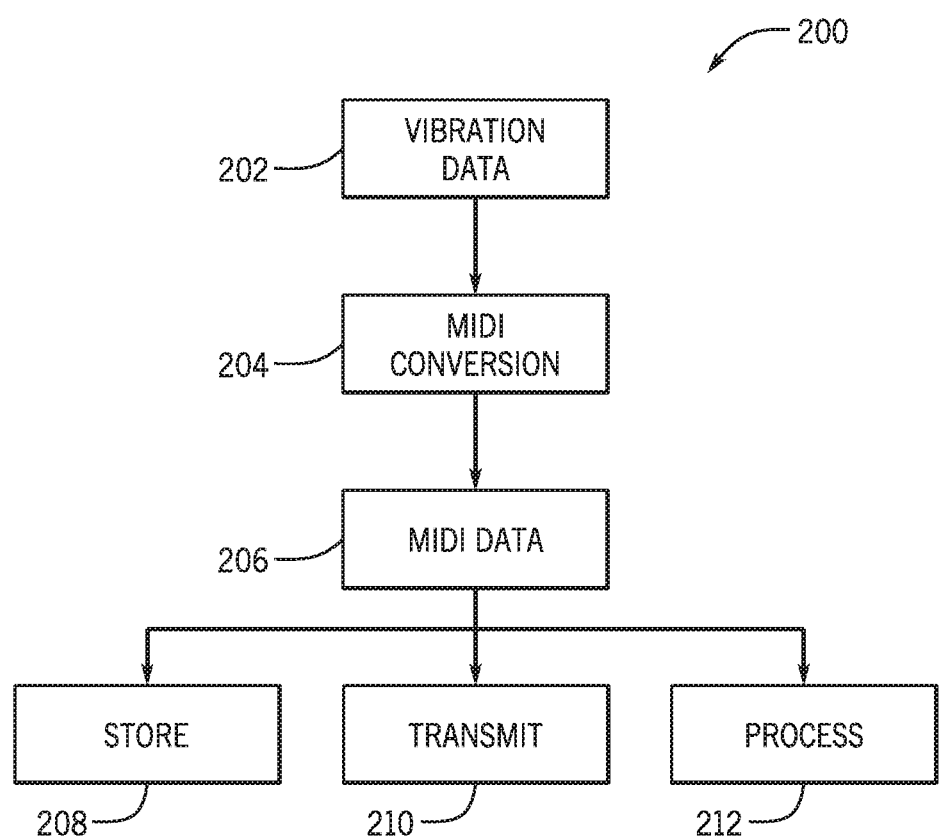
FIG. 11 is a flow chart of an embodiment of a process suitable for deriving and using MIDI data.

FIG. 11 is a flowchart illustrating an embodiment of a process 200 suitable for applying MIDI techniques as described above. The process 200 may be implemented as computer code or instructions stored in the memory 74 and executable via the processor 72. In the depicted embodiment, the process 200 may receive a vibration data (block 202), for example from one or more knock sensors 23. The vibration data may be received either during creation of the fingerprint 100 (e.g., at a manufacturer's laboratory, at a field site, or a combination thereof) or during use of a fingerprint 100, 126 that has already been created, for example, to use the fingerprint 100, 126 to determine that a certain event has occurred (e.g. operating events and/or engine conditions).

The vibration data may then undergo MIDI conversion (block 204). For example, the vibration data may include a set of points in a timeline, each point representative of a sound frequency (e.g., in Hertz as part of sampled audio, which may be encoded as a WAV file, MP3 file, Ogg Vorbis, file and so on). Sampled audio may be converted to MIDI (block 204) through a variety of techniques, including converting chunks of the set of points in the timeline, each point in the timeline, or a combination thereof, into MIDI notes or note. For example, systems like WIDI Recognition System Professional 4.03 available from WIDISOFT Co., Live, available from Ableton AG, and so on, may be used to convert sampled vibrations into MIDI data 206.

Once converted, the MIDI data may be stored (block 208), for example, in the memory 74 and/or in database system(s). Because of the size reduction likely achieved by converting to MIDI data 206, storage requirements may be minimized. The MIDI data 206 may alternatively or additionally be transmitted (block 210). For example, the MIDI data 206 may be transmitted to external systems for further analysis, to other ECUs 25 in a fleet of engines, to storage systems (e.g., cloud storage systems), and so on. The MIDI data may also be processed further (block 212), as described earlier, to derive scalings, fingerprints, wavelet processing, and so on. Further, the MIDI data may be decompressed back to sampled vibrations, for example by converted the MIDI data to WAV data, MP3 data, Ogg Vorbis data, and so on. For example, the noise signal (e.g., vibration data 202) may be converted to MIDI data 206 and then the MIDI data 206 correlated one or more MIDI fingerprints 100, 126. Likewise, the one or more MIDI fingerprints 100, 126 may be converted back to one or more vibration fingerprints (e.g., converted to WAV data, MP3 data, Ogg Vorbis data, and so on) and then the converted data (e.g., vibration data 202) may be correlated to the noise signal.

Technical effects of the invention include characterizing a noise signal and deriving a MIDI signature or fingerprint from the noise signal, which may additionally include preconditioning the noise signal (e.g., converting the signal to MIDI data), applying an ADSR envelope to the noise signal, extracting tonal information (e.g., musical tones) from the noise signal and fitting the noise signal to a chirplet and/or a wavelet. Further, technical effects of the invention may include determining a timing of particular operating events with respect to crank angle based on the characterization of the noise signal and derivation of the signature(s) and/or fingerprints from the noise signal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of monitoring an operating event of a combustion engine, comprising:
    capturing, via baselining the combustion engine, the combustion engine's musical instrument digital interface (MIDI) fingerprint, wherein the MIDI fingerprint comprises a string of musical notes corresponding to engine noises made by the combustion engine during the baselining, and wherein each note comprises a pitch and a MIDI velocity corresponding to a representative noise of the engine noises;
    receiving a noise signal sensed by a knock sensor disposed in or proximate to the combustion engine;
    correlating the noise signal with the combustion engine's musical instrument digital interface (MIDI) fingerprint having at least an Attack Decay Sustain Release (ADSR) envelope indicative of the operating event of the combustion engine; and
    detecting if the operating event has occurred based on the correlating of the noise signal with the fingerprint.

2. The method of claim 1, wherein the operating event comprises an opening of an intake valve of the internal combustion engine, a closing of the intake valve, an opening of an exhaust valve of the internal combustion engine, a closing of the exhaust valve, or a peak firing pressure.

3. The method of claim 1, wherein baselining the combustion engine to derive the combustion engine's MIDI fingerprint having at least the ADSR envelope comprises:
    deriving the ADSR envelope from a baseline noise signal converted into a MIDI encoded baseline noise signal indicative of the operating event and applying a plot of the ADSR envelope and operating event indicator data against time to derive a location of the ADSR envelope at which the operating event occurs.

4. The method of claim 3, comprising deriving the location of the ADSR envelope at which the operating event occurs by determining an intersecting point between the ADSR envelope and the operating event indicator data.

5. The method of claim 3, wherein the location of the ADSR envelope at which the operating event occurs is approximately a midpoint of a decay vector of the ADSR envelope.

6. The method of claim 3, wherein the location of the ADSR envelope at which the operating event occurs is within a mid-region of a decay vector of the ADSR envelope.

7. The method of claim 1, wherein correlating the noise signal with the engine MIDI fingerprint comprises converting the noise signal to a MIDI data and then correlating the MIDI data to the engine's MIDI fingerprint, converting the engine's MIDI fingerprint to a vibration fingerprint and then correlating the noise signal to the vibration fingerprint.

8. The method of claim 1, wherein correlating the noise signal with the MIDI fingerprint having at least the ADSR envelope indicative of the operating event comprises preconditioning the noise signal and superimposing the ADSR envelope onto at least a portion of a plot of the preconditioned noise signal.

9. The method of claim 1, wherein correlating the noise signal with the engine's MIDI fingerprint having at least the ADSR envelope indicative of the operating event comprises applying a plot of the noise signal, or a preconditioned version of the noise signal, against a crank angle signal of a crankshaft of the combustion engine received from a crankshaft sensor and superimposing the ADSR envelope of the engine MIDI fingerprint onto at least a portion of the plot.

10. A system, comprising:
an engine controller configured to monitor a first operating event of a combustion engine, wherein the engine controller comprises a processor configured to:
store a first engine's musical instrument digital interface (MIDI) fingerprint that has been captured via baselining the combustion engine, wherein the MIDI fingerprint comprises a string of musical notes corresponding to engine noises made by the combustion engine during the baselining, and wherein each note comprises a pitch and a MIDI velocity corresponding to a representative noise of the engine noises;
receive a noise signal sensed by a knock sensor disposed in or proximate to the combustion engine;
correlate the noise signal with the first engine's musical instrument digital interface (MIDI) fingerprint having at least a first Attack Decay Sustain Release (ADSR) envelope indicative of the first operating event; and
detect if the first operating event has occurred based on the correlating of the noise signal with the first engine's MIDI fingerprint.

11. The system of claim 10, wherein the controller comprises a memory configured to store one or more MIDI fingerprints, each MIDI fingerprint having a respective ADSR envelope indicative of a corresponding operating event, and wherein the processor is configured to access the memory to correlate the noise signal with the first engine MIDI fingerprint having at least the first ADSR envelope indicative of the first operating event.

12. The system of claim 10, comprising the knock sensor configured to sense the noise signal and a crankshaft sensor configured to sense a crank angle of a crankshaft of the combustion engine, and wherein the processor is configured to correlate the noise signal with the first engine's MIDI fingerprint by converting the noise signal to a MIDI data and then correlate the MIDI data to the first engine's MIDI fingerprint, wherein the processor is configured to convert the MIDI fingerprint to a vibration fingerprint and then correlate the noise signal to the vibration fingerprint, or a combination thereof.

13. The system of claim 12, wherein the processor is configured to apply a plot of the noise signal, or a preconditioned version of the noise signal, against the crank angle, and superimpose the first ADSR envelope over the noise signal or preconditioned noise version of the noise signal via the plot.

14. The system of claim 13, wherein the processor is configured to derive a location on the superimposed first ADSR envelope at which the operating event occurs.

15. The system of claim 14, wherein the processor is configured to determine a midpoint of a decay vector of the superimposed first ADSR envelope, wherein the location on the superimposed first ADSR envelope at which the operating event occurs is the midpoint.

16. The system of claim 10, wherein the operating event comprises an opening of an intake valve of the combustion engine, a closing of the intake valve, an opening of an exhaust valve of the combustion engine, a closing of the exhaust valve, or a peak firing pressure.

17. A non-transitory computer readable medium comprising executable instructions that, when executed, cause a processor to:
retrieve a combustion engine's musical instrument digital interface (MIDI) fingerprint that has been captured via baselining the combustion engine;
receive, from a knock sensor disposed in or proximate to the combustion engine, noise data indicative of noise emitted by the combustion engine;
receive, from a crankshaft sensor disposed in or proximate to the combustion engine, crank angle data indicative of a crank angle of a crankshaft of the combustion engine;
derive a plot of the noise data against the crank angle data;
determine a portion of the noise data that corresponds to an engine's musical instrument digital interface (MIDI) fingerprint having a reference Attack Decay Sustain Release (ADSR) envelope indicative of an operating event of the combustion engine, wherein the MIDI fingerprint comprises a string of musical notes corresponding to engine noises made by the combustion engine during baselining, and wherein each note comprises a pitch and a MIDI velocity corresponding to a representative noise of the engine noises;
superimpose the reference ADSR envelope over the noise data via the plot; and
determine a location in the noise data at which the operating event occurred.

18. The non-transitory computer readable medium comprising executable instructions of claim 17 that, when executed, further cause the processor to:
determine a midpoint on a decay vector of the reference ADSR envelope, wherein the midpoint on the decay vector of the reference ADSR envelope corresponds to the location at which the operating event occurs.

19. The non-transitory computer readable medium comprising executable instructions of claim 17 that, when executed, further cause the processor to precondition the noise data before deriving the plot of the noise data.

* * * * *